(12) United States Patent
Fan et al.

(10) Patent No.: US 9,904,072 B2
(45) Date of Patent: Feb. 27, 2018

(54) LENS DRIVING DEVICE

(71) Applicant: TDK TAIWAN CORP., Yangmei Taoyuan (TW)

(72) Inventors: Chen-Hsien Fan, Yangmei Taoyuan (TW); Bing-Ru Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 69 days.

(21) Appl. No.: 15/229,726

(22) Filed: Aug. 5, 2016

(65) Prior Publication Data

US 2017/0038601 A1 Feb. 9, 2017

(30) Foreign Application Priority Data

Aug. 7, 2015 (TW) .............................. 104125746 A

(51) Int. Cl.
  *G02B 27/64* (2006.01)
  *H02K 41/035* (2006.01)
(52) U.S. Cl.
  CPC ....... *G02B 27/646* (2013.01); *H02K 41/0356* (2013.01); *G03B 2205/0007* (2013.01)
(58) Field of Classification Search
  CPC .......... G02B 27/646; G02B 7/08; G02B 7/09; G02B 7/04; G02B 7/022; G02B 7/023; G02B 7/28; G02B 7/36; G02B 7/38; G03B 2205/0069; G03B 2205/0007; G03B 3/10; G03B 3/00; G03B 13/36; G03B 17/12

USPC ...... 396/55, 133, 529, 52, 535, 79; 359/557, 359/825, 811, 823

See application file for complete search history.

(56) References Cited

U.S. PATENT DOCUMENTS

| | | | |
|---|---|---|---|
| 8,749,645 B2* | 6/2014 | Wu .......................... | G02B 7/08 348/208.5 |
| 2011/0286732 A1* | 11/2011 | Hosokawa ............... | G03B 3/02 396/55 |
| 2017/0108706 A1* | 4/2017 | Kim ..................... | G02B 27/646 |

* cited by examiner

*Primary Examiner* — Bumsuk Won
*Assistant Examiner* — Collin X Beatty
(74) *Attorney, Agent, or Firm* — Muncy, Geissler, Olds & Lowe, P.C.

(57) ABSTRACT

A lens driving device includes a lens holder having a position sensor and a driving coil on an outer surface thereof; a frame accepting the lens holder and holding a plurality of driving magnets facing the driving coil and a hall magnet facing the position sensor; a plurality of springs connected between the lens holder and the frame to allow the lens holder moving in an optical axis direction with respect to the frame; a base portion having a circuit board; and a plurality of suspension lines connected between the springs and the circuit board to allow the frame and the lens holder moving in the direction perpendicular to the optical axis direction with respect to the base portion, wherein the circuit board is electrically connected to the position sensor and the driving coil through the suspension lines and the springs.

13 Claims, 11 Drawing Sheets

LENS DRIVING DEVICE

CROSS REFERENCE TO RELATED APPLICATIONS

This application claims priority of Taiwan Patent Application No. 104125746, filed on Aug. 7, 2015, the entirety of which is incorporated by reference herein.

BACKGROUND OF THE INVENTION

Field of the Invention

The present invention relates to a lens driving device, and in particular to a lens driving device with a 3-axis closed loop stabilization system.

Description of the Related Art

With the growing popularity of portable devices equipped with a camera, users become used to use the camera function of the portable device. However, the users generally do not prepare a tripod to stabilize the portable device when they use the portable device to shoot a picture. Therefore, under an environment with insufficient light, the photo is often blurred because of camera shake.

The commonly used anti-shake method includes optical image stabilization (OIS), which moves the optical lens module or photosensitive module to offset the influence due to camera shake to maintain a stable optical imaging system. In the past, a 2-axis closed loop stabilization system has been often used, and the shake in the direction parallel to the photosensitive plane can be compensated. If the shake in the direction perpendicular to the photosensitive plane (the optical axis direction) is tried to be compensated, a position sensor for the optical axis direction, for example a hall element, should be disposed.

However, the position sensor for the optical axis direction is installed in an autofocus (AF) module. The position sensor needs to be electrically connected to a circuit board located in the optical image stabilization module. In addition, a driving coil installed in the autofocus module also needs to receive a driving signal transmitted from the circuit board. In a compact lens driving device, the signal transmitting path has to be arranged in a limited space. Therefore, how to save space to simply assemble a 3-axis closed loop stabilization system in a lens driving device is still a problem on the market for many years which needs to be solved.

BRIEF SUMMARY OF THE INVENTION

A detailed description is given in the following embodiments with reference to the accompanying drawings.

In view of the above problems, the invention provides a lens driving device including: a lens portion having at least one lens; a lens holder holding the lens portion and having a position sensor and a driving coil on an outer surface thereof; a plurality of 3-dimensional circuits are formed on the outer surface of the lens holder; a frame accepting the lens holder and holding a plurality of driving magnets facing the driving coil and a sensed object facing the position sensor; a plurality of springs connected between the lens holder and the frame to allow the lens holder moving in an optical axis direction with respect to the frame; a base portion having a circuit board; and a plurality of suspension lines connected between the plurality of springs and the circuit board to allow the frame and the lens holder moving in the direction perpendicular to the optical axis direction with respect to the base portion, wherein the circuit board is electrically connected to the position sensor and the driving coil through the plurality of suspension lines, the plurality of springs, and the plurality of 3-dimensional circuits.

In the lens driving device, the lens portion has a quadrilateral structure, and the plurality of suspension lines are disposed at four corners of the quadrilateral structure.

In the lens driving device, the lens portion has a quadrilateral structure, and the number of the plurality of suspension lines is six.

In the lens driving device, the plurality of springs include: a B spring disposed at a light exit side of the frame, and an F spring disposed at a light incident side of the frame, wherein the F spring is divided into a plurality of pieces which are electrically independent and connected to the plurality of suspension lines respectively.

In the lens driving device, the B spring is divided into two pieces which are electrically independent, wherein four of the six pieces of the F spring have a respective arm part extending to the lens holder.

In the lens driving device, the frame has a plurality of spring connection portions electrically connected to the plurality of springs respectively.

In the lens driving device, the plurality of spring connection portions are formed to the frame by an insert molding technique or a molded interconnect device technique.

In the lens driving device, the plurality of 3-dimensional circuits are formed to the lens holder by an insert molding technique or a molded interconnect device technique In the lens driving device, when observed from the optical axis direction the sensed object is located between two adjacent ones of the plurality of driving magnets.

In the lens driving device, when observed from a direction perpendicular to the optical axis direction the sensed object is close to a light incident side and the plurality of driving magnets are close to a light exit side.

In the lens driving device, a first stop plate protruding in a direction away from the optical axis is formed on the outer surface of the lens holder at a light incident side, and a second stop plate protruding in the direction away from the optical axis is formed on the outer surface of the lens holder at a light exit side. The frame is abutted against the first stop plate or the second plate in the optical axis direction to limit a movable range of the lens holder in the optical direction.

In the lens driving device, when observed from the optical axis direction the first stop plate and the second plate are not overlapped.

In the lens driving device, a yoke plate with strong magnetic permeability is disposed close to each of the plurality of driving magnets at a side away from the optical axis, and the yoke plate is formed on the outer surface of the frame by an insert molding technique.

According the embodiments of the invention, a lens driving device is obtained, in which the signal transmitting paths are arranged in a limited space to achieve 3-axis closed loop stabilization effect, and the lens driving device can be assembled easily in low cost.

BRIEF DESCRIPTION OF THE DRAWINGS

The present invention can be more fully understood by reading the subsequent detailed description and examples with references made to the accompanying drawings, wherein:

FIG. 7b is the top view of the structure shown in FIG. 7a;

FIG. 8b is a front view of the z-axis hall element shown in FIG. 8a;

FIG. 9b is a section view taken from the line B-B shown in FIG. 9a;

FIG. 9c is a section view taken from the line C-C shown in FIG. 9a; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
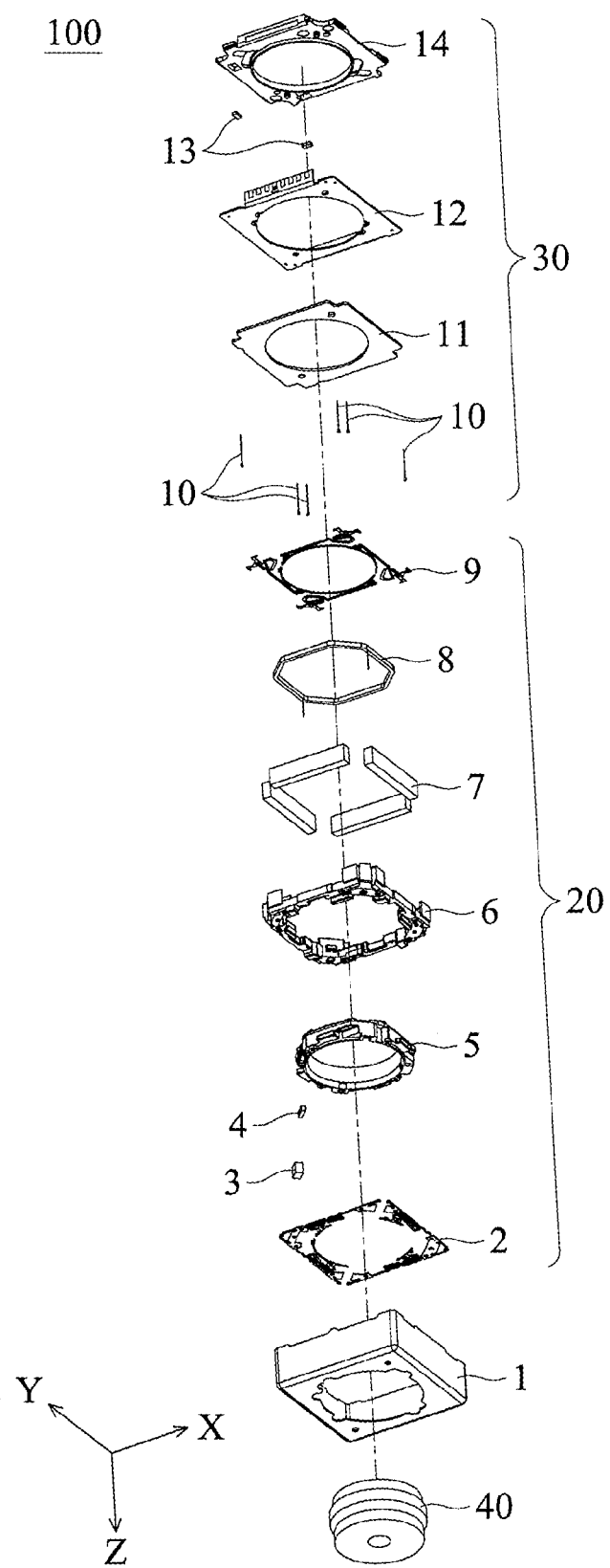
FIG. 1 is an exploded perspective view of a lens driving device in accordance with an embodiment of the invention.

FIG. 1 is an exploded perspective view of a lens driving device in accordance with an embodiment of the invention. The lens driving device 100 includes a lens portion 40, a housing 1, an autofocus module 20, and an optical image stabilization module 30. The autofocus module 20 and the optical image stabilization module 30 are assembled along the optical axis direction (the z-axis direction), and then encased by the housing 1.

The autofocus module 20 can carry a lens portion 40 and drive the lens portion 40 to move along the optical axis direction (the z-axis direction) to perform the autofocus function. The autofocus module 20 further includes a position sensor for the z-axis direction, for example, a Hall sensor, a magnetoresistive sensor, a magnetic flux sensor, etc. (The following embodiments will use a z-axis Hall magnet as an example), to sense the z-axis position of the lens portion 40. When the z-axis Hall magnet senses z-axis displacement, the autofocus module 20 drives the lens portion 40 to move along the z-axis direction to compensate the displacement. Thereby, a control system for z-axis closed loop stabilization is realized.

The autofocus module 20 can be for example a voice coil motor (VCM) driving structure. In FIG. 1 the autofocus module 20 includes, along the −z direction, an F spring 2, a Hall magnet 3 (a sensed object), a z-axis Hall element 4 (a position sensor), a lens holder 5, a frame 6, a driving magnet 7, a driving coil 8, and two B springs 9.

Figure 2:
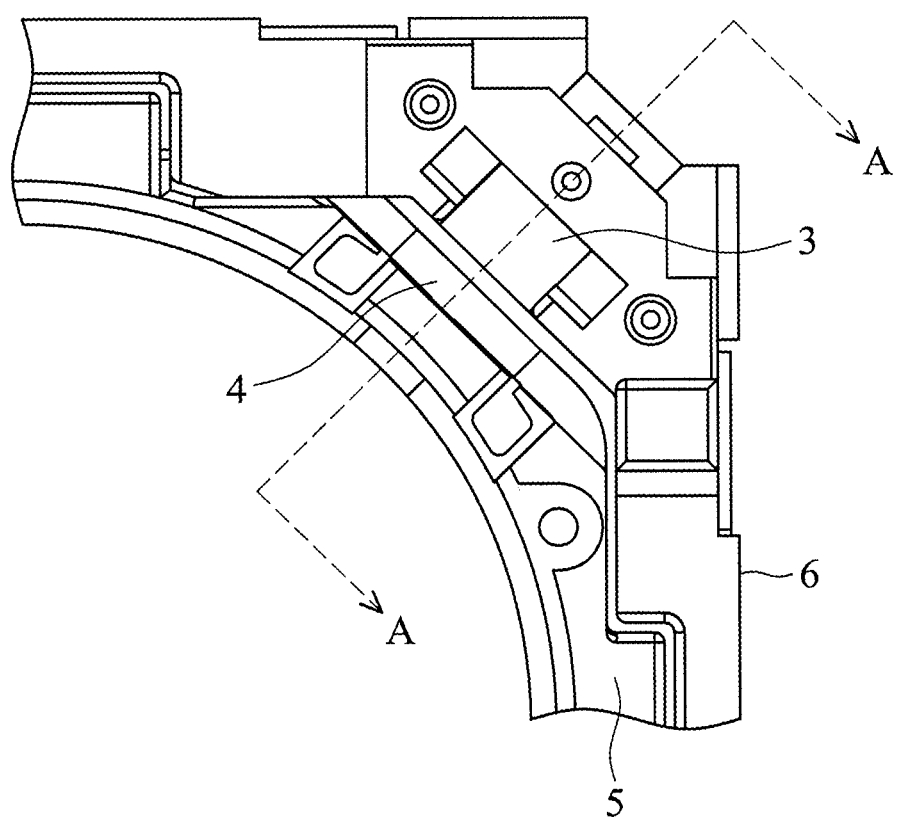
FIG. 2 is a top view of a lens holder and a corner of a frame in accordance with an embodiment of the invention.

The lens holder 5 is used to carry and lock the lens portion 40. The outer surface of the lens holder 5 is disposed with the z-axis Hall element 4 and winded with the driving coil 8. The frame 6 is disposed with the Hall magnet 3. Each of the four sides of the frame 6 is respectively disposed with the driving magnet 7. FIG. 2 is a top view of the lens holder 5 and a corner of the frame 6 in accordance with an embodiment of the invention. As shown in FIG. 2, after the lens holder 5 and the frame 6 are assembled, the z-axis Hall element 4 disposed on the lens holder 5 faces the Hall magnet 3 disposed on the frame 6. Because the z-axis Hall element 4 is lighter than the Hall magnet 3, the z-axis Hall element 4 is disposed on the lens holder 5, which is a movable element, to save the power for driving the lens holder 5. In the other hand, the Hall magnet 3 is disposed on the frame 6, which is a fixed element to increase the area of the Hall magnet 3, so that the z-axis Hall element 4 could perform sensing with high accuracy within a wide position range. In addition, since the Hall magnet 3 and the driving magnet 7 are fixed to the frame 6, the Hall magnet 3 and the driving magnet 7 cannot move relatively due to attraction or repulsion.

Figure 3:
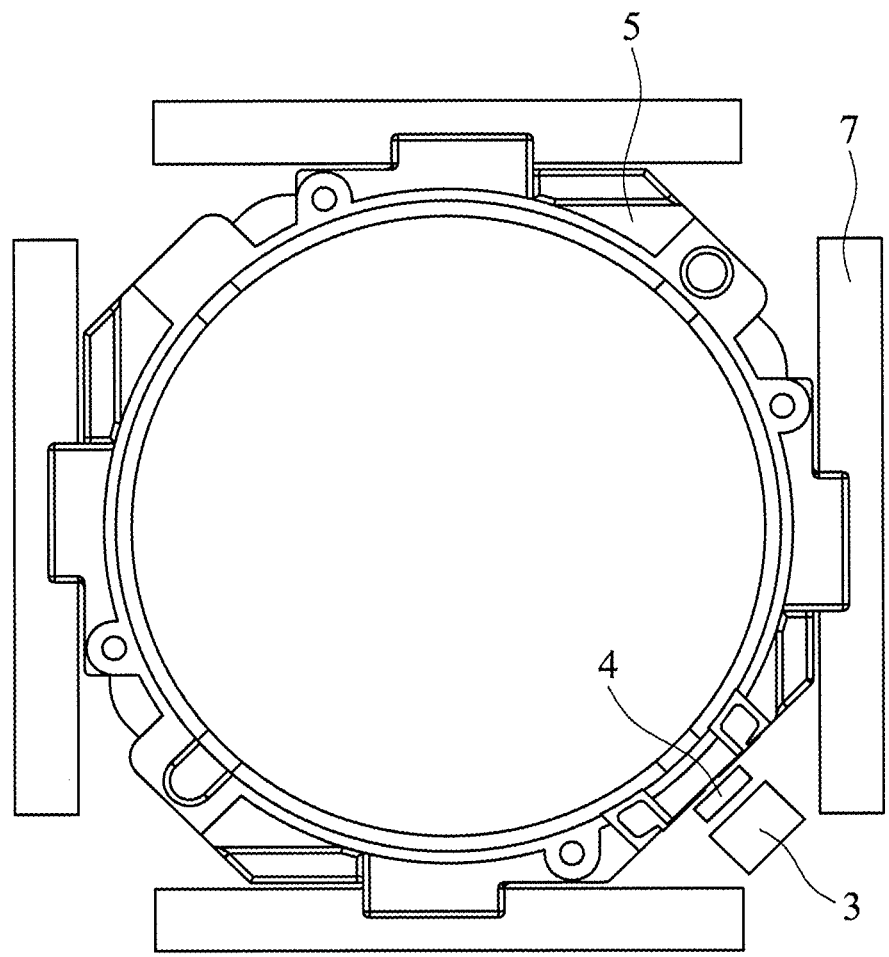
FIG. 3 is a top view of some components of an autofocus module in accordance with an embodiment of the invention.

FIG. 3 is a top view of some components of an autofocus module in accordance with an embodiment of the invention. As shown in FIG. 3, when the Hall magnet 3 and the driving magnet 7 disposed on the frame 6 (not shown in FIG. 3) is observed from the optical axis direction (the z-axis direction), the four elongated driving magnets 7 are placed to form a quadrilateral and the Hall magnet 3 is disposed at a corner of the quadrilateral. Namely, the Hall magnet 3 is located between the two adjacent driving magnets 7. With this configuration, the z-axis Hall element 4 facing the Hall magnet 3 is much difficult to be influenced by the magnetic field of the driving magnets 7, so that the precision of the position sensing can be maintained. Further, the Hall magnet 3 and the driving magnets 7 are not overlapped in the optical axis direction, so the thickness of the frame 6 can be restrained and it helps the miniaturization of the entire driving device.

Figure 4:
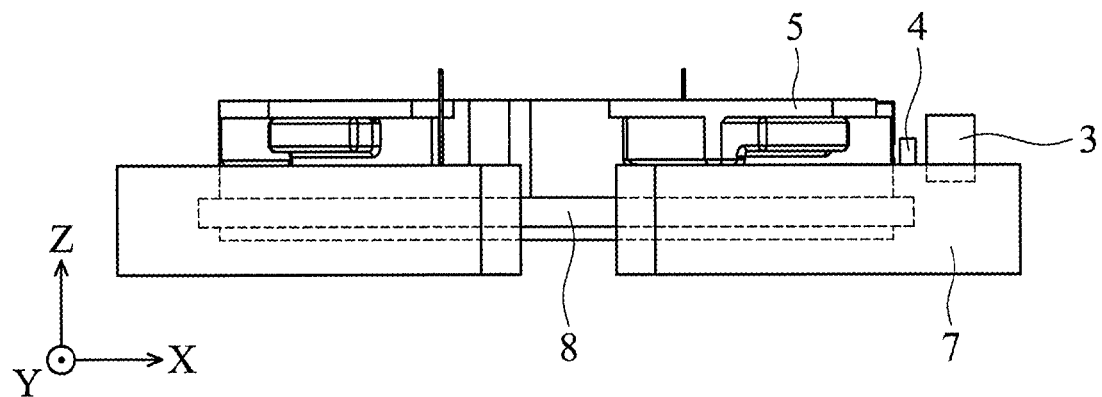
FIG. 4 is a side view of some components of an autofocus module in accordance with an embodiment of the invention.
Figure 5:
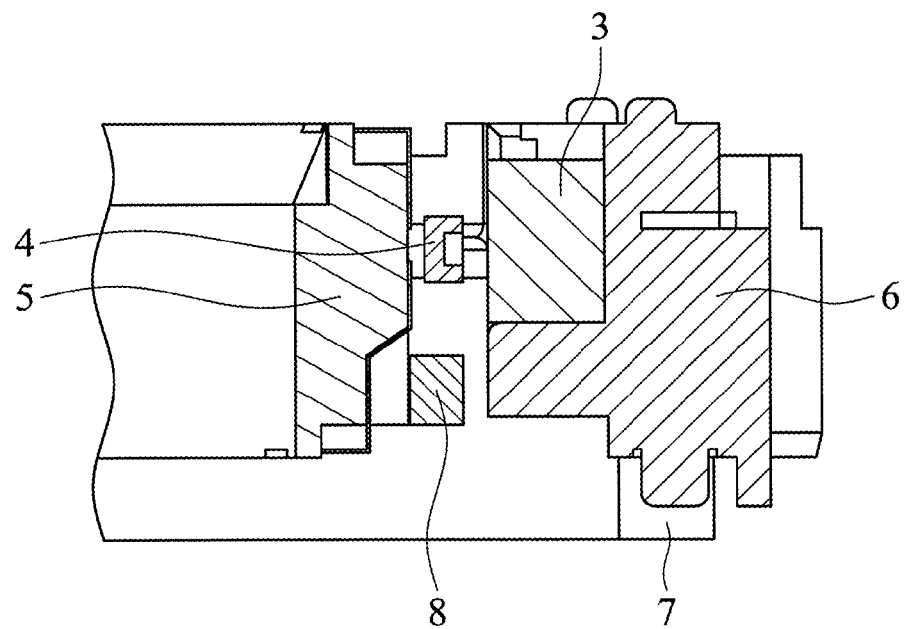
FIG. 5 is a section view taken from the line A-A shown in FIG. 2.

FIG. 4 is a side view of some components of an autofocus module in accordance with an embodiment of the invention. As shown in FIG. 4, when the Hall magnet 3 and the driving magnet 7 are observed from the direction perpendicular to the optical axis direction, the Hall magnet 3 is disposed close to the incident side of light beams (the upper side in FIG. 4) and the driving magnets 7 are disposed close to the exit side of light beams (the lower side in FIG. 4). They are located in different altitude, so the influence of the magnetic field of the driving magnet 7 to the Hall magnet 3 can be reduced to maintain the accuracy of position detection. FIG. 5 is a section view taken from the line A-A shown in FIG. 2. The position relationship among the Hall magnet 3, the z-axis Hall element 4, the driving magnet 7, and the driving coil can be understood from FIG. 5. The Hall magnet 3 and the z-axis Hall element 4 face each other at the incident side of light beams. The driving magnet 7 and the driving coil 8 face each other at the exit side of light beams. Because the Hall magnet 3 and the driving magnet 7 are both disposed on a fixed element, the frame 6, the situation that heavy elements are installed at the same side of the lens holder 5 and the lens holder 5 is inclined can be avoided.

Back to FIG. 1, the optical image stabilization module 30 uses the position sensor for the x-axis position and the position sensor for the y-axis position (for example, the xy-axis position sensor described later) to sense the x-axis displacement and y-axis displacement of the autofocus module 20. Then the optical image stabilization module 30 drives an xy-axis coil disposed on a circuit board 12 to move the autofocus module 20 in the x-axis direction and the y-axis direction to compensate the x-axis displacement and y-axis displacement. Thereby, a control system for xy-axis closed loop stabilization is realized.

The optical image stabilization module 30 includes, along the −z direction, six suspension lines 10, an xy-axis coil 11, a circuit board 12, an xy-axis position sensor 13, and a base portion 14. It is preferred that the base portion 14 has enough strength to support the circuit board 12 or the suspension lines 10 disposed on the base portion 14. The base portion 14 doesn't move relatively to an image sensor which is located at the −z direction and not shown in FIGS. The circuit board 12 has wirings to transmit electric signals to the driving circuit 8 and the xy-axis coil 11. The circuit boards 12 can be a flexible printed circuit (FPC) board. The circuit boards 12 is fixed to the base portion 14 by bonding and supported by the base portion 14.

The circuit board 12 is electrically connected to a driving control portion (not shown in FIGS.) which is outside the lens driving device 100. Namely, the circuit board 12 has wirings connected to each electric element of the lens driving device 100, so as to drive and control the driving coil 8 and the xy-axis coil 11 to perform the autofocus and stabilization functions.

The xy-axis position sensor 13 is disposed under the circuit board 12. The xy-axis position sensor 13 is for example a Hall sensor, a magnetoresistive sensor, a magnetic flux sensor, etc. The xy-axis position sensor 13 senses the position of the autofocus module 20 with respect to the base portion 14. Specifically, the xy-axis position sensor 13 senses the variation of the magnetic field due to the movement of the driving magnets 7 installed on the autofocus module 20 and thereby obtains the position of the autofocus module 20 in the plane (the xy plane) which is perpendicular to the optical axis direction.

The xy-axis coil 11 is disposed on the circuit board 12 and includes four coils. These four coils are arranged at four sides of a quadrilateral and face four driving magnets 7 respectively in the optical axis direction. The circuit board 12 supplies electric current that drives the autofocus portion 20 to move in the plane which is perpendicular to the optical axis direction to each coil of the xy-axis coil 11.

The suspension lines 10 connect the autofocus module 20 and the optical image stabilization module 30, such that the autofocus module 20 can move relatively to and the optical image stabilization module 30. The lens driving device 100 of the embodiment includes six suspension lines 10. The materials of the suspension line 10 are not limited but phosphor bronze is preferred.

In this embodiment, when observed from the z-axis direction, the suspension lines 10 are disposed at four corners of the rectangular cross-section of the lens driving device 100. Note that there are two corners disposed with two suspension lines 10. An end of each suspension line 10 is fixed to the circuit board 12 of the optical image stabilization module 30, and the other end is fixed to the F spring 2 of the autofocus module 20. By fixing the suspension line 10 to the F spring which is disposed at the end of the autofocus module 20 in the +z-axis direction, the suspension line 10 is stretched to supply enough strength to support the autofocus module 20 and increase the movable range of the autofocus module 20 in the xy-axis direction.

In this embodiment, one end of two suspension lines 10 in the six suspension lines 10 is electrically connected to the driving coil 8 via the F spring 2, and the other end is electrically connected to the circuit board 12. For ease of explanation, these two suspension lines are called driving suspension lines 10d. One end of the other four suspension lines 10 in the six suspension lines 10 is electrically connected to four pins of the z-axis Hall element 4 via the F spring 2, and the other end is electrically connected to the circuit board 12. For ease of explanation, these four suspension lines are called sensing suspension lines 10s.

Figure 6:
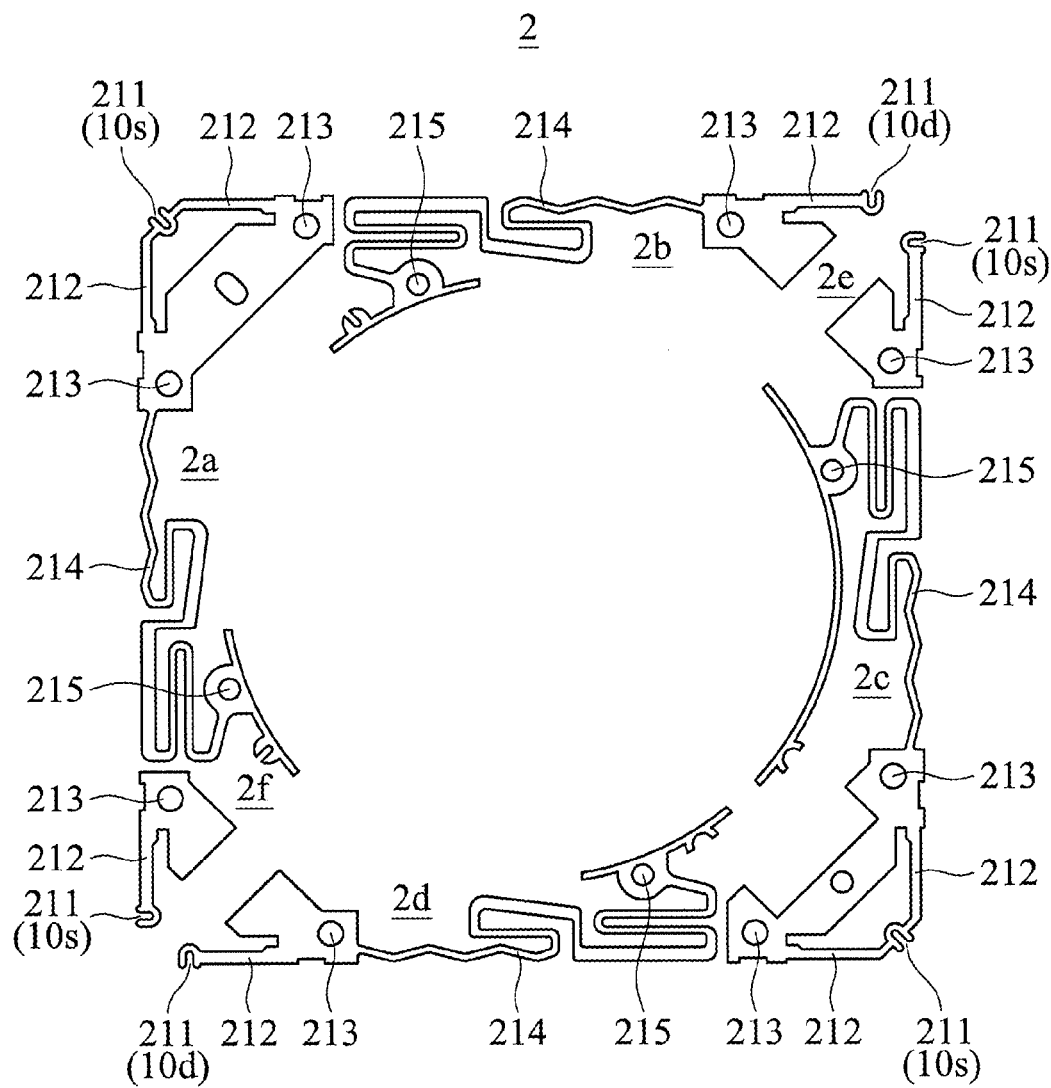
FIG. 6 is a top view of a F spring in accordance with an embodiment of the invention.

FIG. 6 is a top view of a F spring in accordance with an embodiment of the invention. In this embodiment, the F spring 2 is divided into six pieces 2a~2f. Each F spring 2a~2f has a suspension line connection part 211, a deformation prevention part 212, and a frame connection part 213. The suspension line connection part 211 is a part to fix the suspension line 10. The frame connection part 213 is a part directly in contact with the frame 6. The deformation prevention part 212 is connected between the suspension line connection part 211 and the frame connection part 213 to prevent each F spring 2a~2f from deformation damage. In FIG. 2, the F springs 2a~2d further include an arm part 214 extending meanderingly toward the lens holder 5, and a lens holder connection part 215 in contact with the lens holder 5.

In this embodiment, the two driving suspension lines 10d are respectively connected to the suspension line connection parts 211 of the F spring 2b and 2d. Therefore, the two driving suspension lines 10d are located at two corner of the rectangular circuit board 12 in the diagonal direction. The four sensing suspension lines 10s are respectively connected to the suspension line connection parts 211 of the F spring 2a, 2c, 2e, and 2f. Therefore, the four sensing suspension lines 10s are located at four corner of the rectangular circuit board 12. With this configuration, the driving suspension lines 10d are disposed at two positions which are symmetry with respect to the optical axis and the sensing suspension lines 10s are disposed at four positions which are symmetry with respect to the optical axis.

In this embodiment, only the F springs 2a-2d are in contact with the lens holder 5. The F springs 2e and 2f are not in contact with the lens holder 5. The reason is that the F springs 2a-2d use their lens holder connection part 215 to be electrically connected to two ends of the driving spring 8 and the two pins of the z-axis Hall element 4 disposed on the lens holder 5. The F springs 2e and 2f use their frame connection part 213 to be connected to two spring connection portions which will be described later. The two spring connection portions are electrically connected to the two B springs 9. These two B springs 9 are further electrically connected to the other two pins of the z-axis Hall element 4.

Figure 7A:
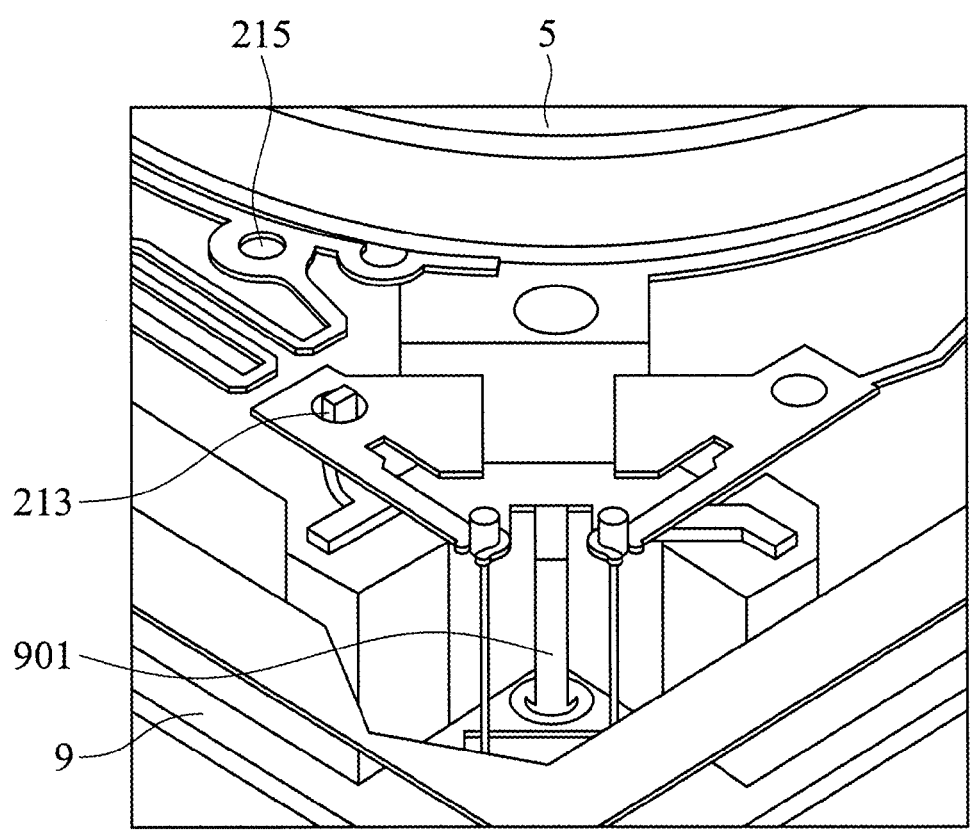
FIG. 7a is a perspective view of a corner of a structure assembled by an F spring, a lens holder, and B springs in accordance with an embodiment of the invention.
Figure 7B:
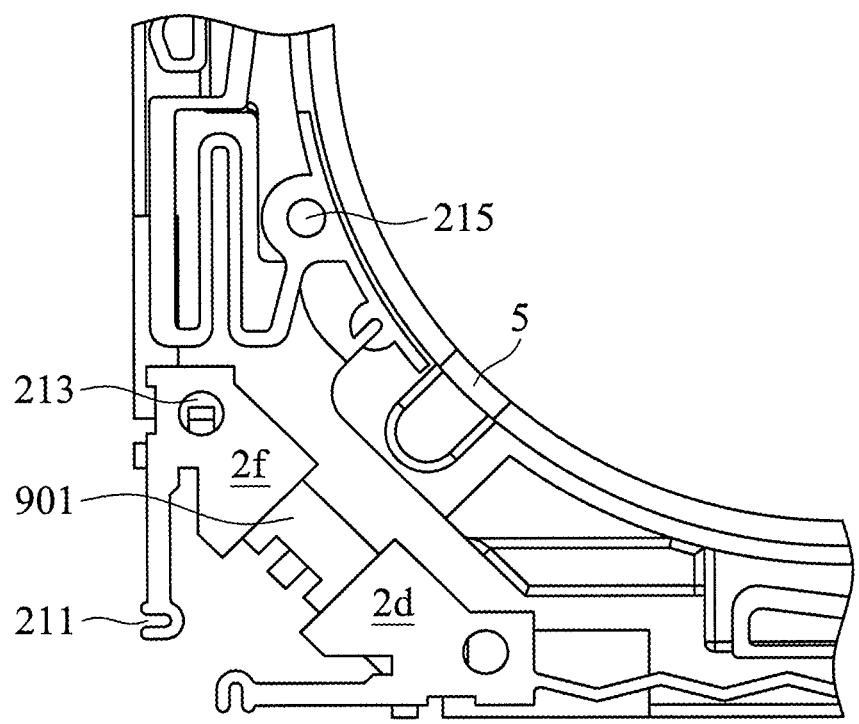

FIG. 7a is a perspective view of a corner of a structure assembled by the F spring 2, the lens holder 5, and the B spring 9 in accordance with an embodiment of the invention; FIG. 7b is the top view of the structure shown in FIG. 7a. the 3-dimensional position relationship among the F spring 2, the lens holder 5, and the B spring 9 can be clearly seen from FIGS. 7a and 7b. the F spring 2f forms on the spring connection portion 901 of the frame 6 to be electrically connected to the B spring 9 by an insert molding technique or a molded interconnect device technique (a technique to form conductive circuits on the 3-dimensional surface of the nonconductive molded element, for example LASER direct structuring or MIPTEC). In FIG. 7a, it can be seen that the frame connection 213 of the F spring 2f is in contact with the spring connection portion 901 to electrically connect the F spring 2f with the B spring 9. The other F springs connected to the lens holder 5 are electrically connected to 3-dimensional circuits 511, 512, 513, and 514 disposed on the lens holder 5.

Figure 8A:
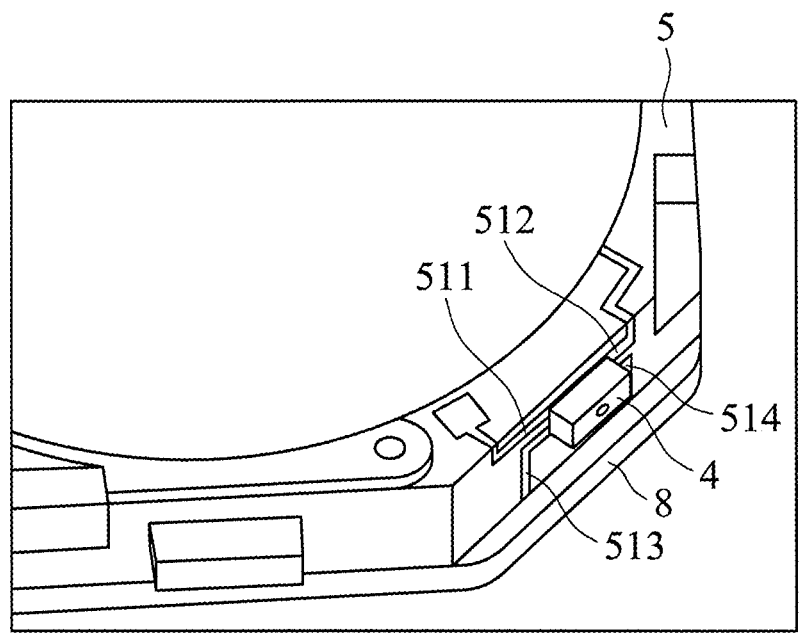
FIG. 8a is a perspective view of a z-axis hall element and three-dimensional circuits disposed on the lens holder.
Figure 8B:
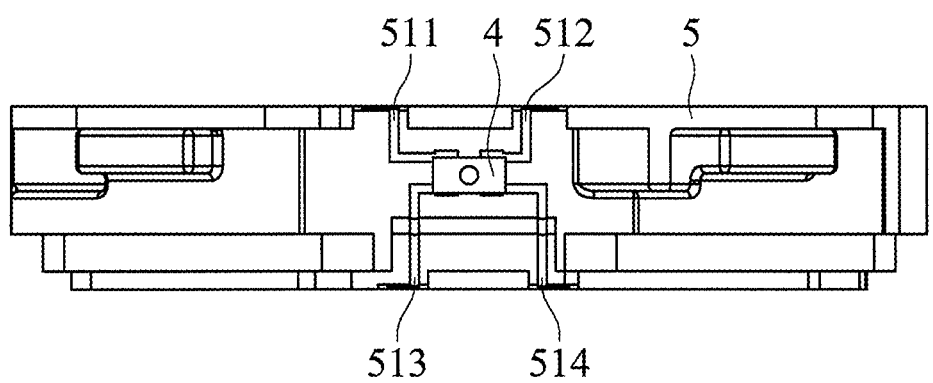

In the following paragraph, the 3-dimensional circuits 511, 512, 513, and 514 disposed on the lens holder 5 are described with reference to FIGS. 8a and 8b. FIG. 8a is a perspective view of a z-axis hall element and the three-dimensional circuits disposed on the lens holder. FIG. 8b is a front view of the z-axis hall element shown in FIG. 8a. As shown in FIGS. 8a and 8b, the z-axis hall element 4 has four pins transmit electric signal via the 3-dimensional circuits 511, 512, 513, and 514 respectively, which forms on the lens holder 5 by the insert molding technique or the molded interconnect device technique. The 3-dimensional circuits 511 and 512 extend to a light-incident-side surface of the lens holder 5 and have contact pins which are electrically connected to the lens holder connection part 215 of the F spring 2. The 3-dimensional circuits 513 and 514 extend to a light-exit-side surface of the lens holder 5 and have contact pins (not shown) which are electrically connected to the two B springs 9. With this configuration, the four pins of the z-axis Hall element 4 are respectively tow F springs 2 and two B springs 9, and the two B spring springs 9 uses the spring connection portion 901 to electrically connect with the other two F springs 2. Therefore, the four pins of the z-axis Hall element 4 are electrically connected to the circuit board 14 via the four F springs 2 and the four suspension lines 10. With the configuration of the 3-dimensional circuits 511, 512, 513, and 514, the connection manner is more reliable than wiring connection and more suitable for miniaturization. To avoid a short-circuit generated because of the contact between the driving coil 8 and the 3-dimensional circuits 513 and 514 which extend to the light-exit-side surface of the lens holder 5, the lens holder 5 can provided with a concave surface on a portion where the 3-dimensional circuits 513 and 514 face the driving coil 8.

Figure 9A:
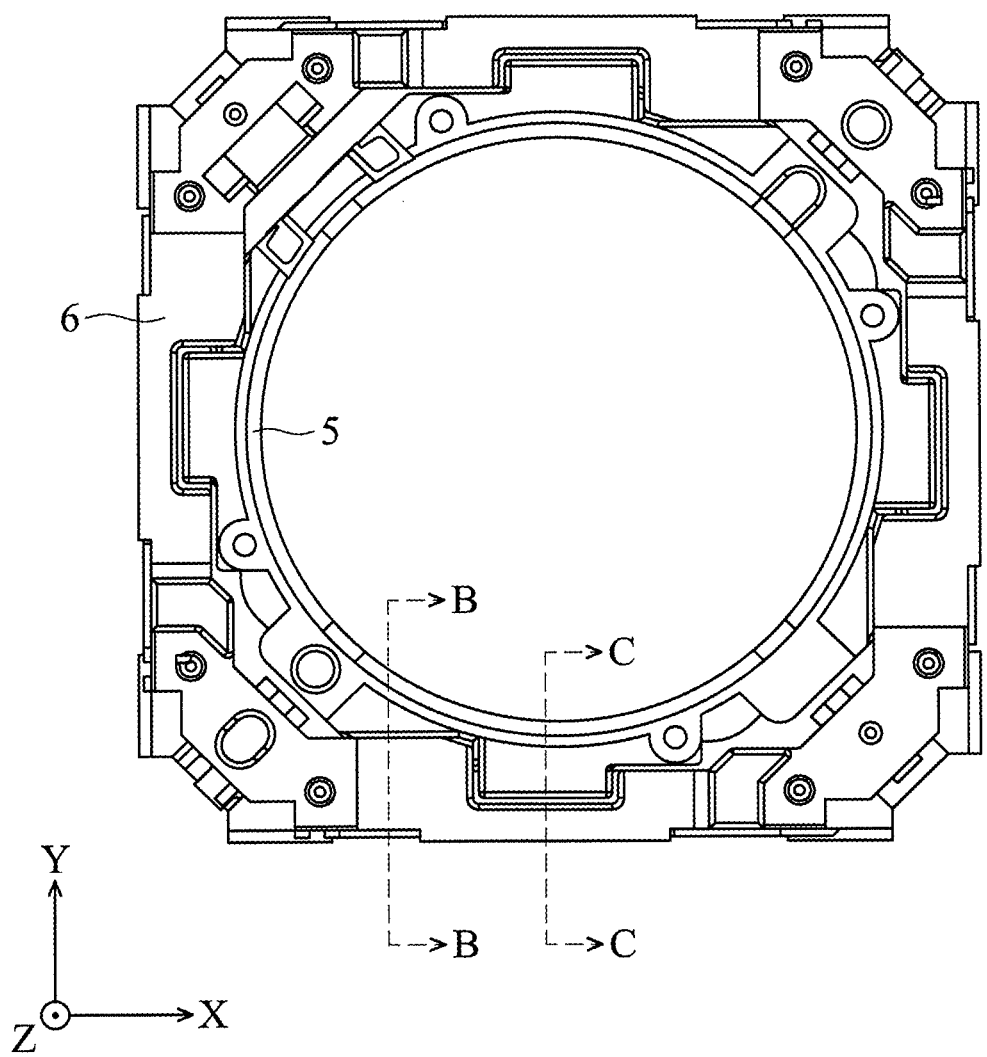
FIG. 9a is a top view of a structure assembled by a lens holder and a frame in accordance with an embodiment of the invention.
Figure 9B:
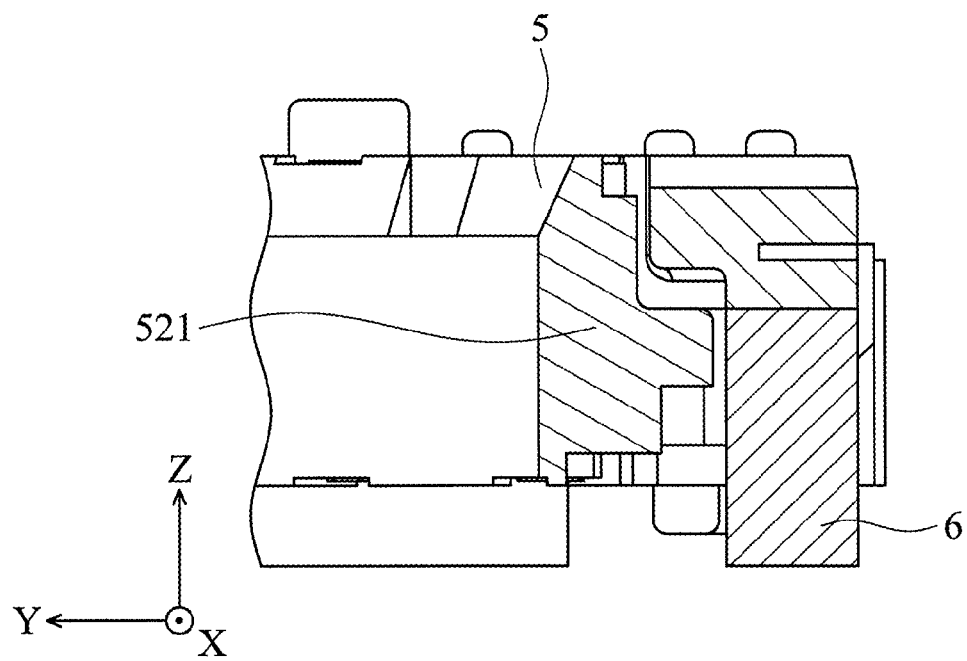
Figure 9C:
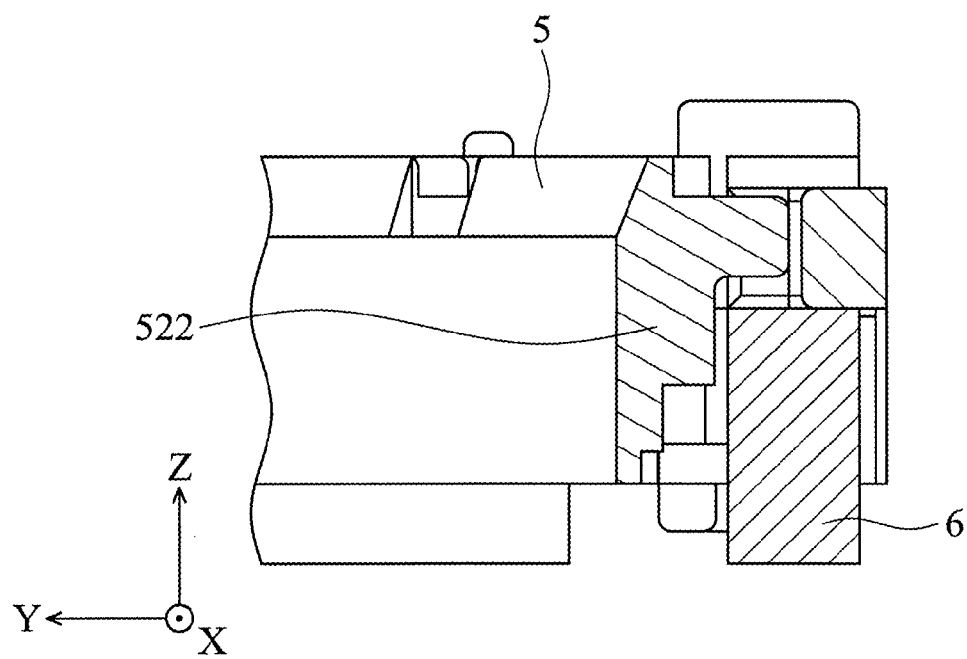

In addition, it is also possible to design a stop plate on the lens holder 5 to limit the movable range of the lens holder 5. FIG. 9a is a top view of a structure assembled by the lens holder 5 and the frame 6 in accordance with an embodiment of the invention. FIG. 9b is a section view taken from the line B-B shown in FIG. 9a. FIG. 9c is a section view taken from the line C-C shown in FIG. 9a. As shown in FIGS. 9a and 9b, the lens holder 5 has stop plates 521 which protrude in a direction (radial direction) away from the optical axis. With the stop plate 521, when the lens holder 5 continue moving toward the +z-axis direction, the stop plate 521 will be in contact with a top protrusion portion of the frame 6 to prevent excessive movement of the lens holder 5 in the +z-axis direction. Similarly, as shown in FIGS. 9a and 9c, the lens holder 5 has stop plates 522 which protrude in a direction (radial direction) away from the optical axis. With the stop plate 522, when the lens holder 5 continue moving toward the −z-axis direction, the stop plate 521 will be in contact with a bottom protrusion portion of the frame 6 to prevent excessive movement of the lens holder 5 in the −z-axis direction. According to the embodiment, the stop plates 521 and 522 can limit the movable range of the lens holder 5 in the z-axis direction to prevent damage due to excessive movements. Further, it can be seen from FIG. 9a that the stop plates 521 and 522 are not overlapped in the optical axis direction. This design can reduce the thickness of the lens holder 5 and helps the miniaturization of the entire driving device.

Figure 10:
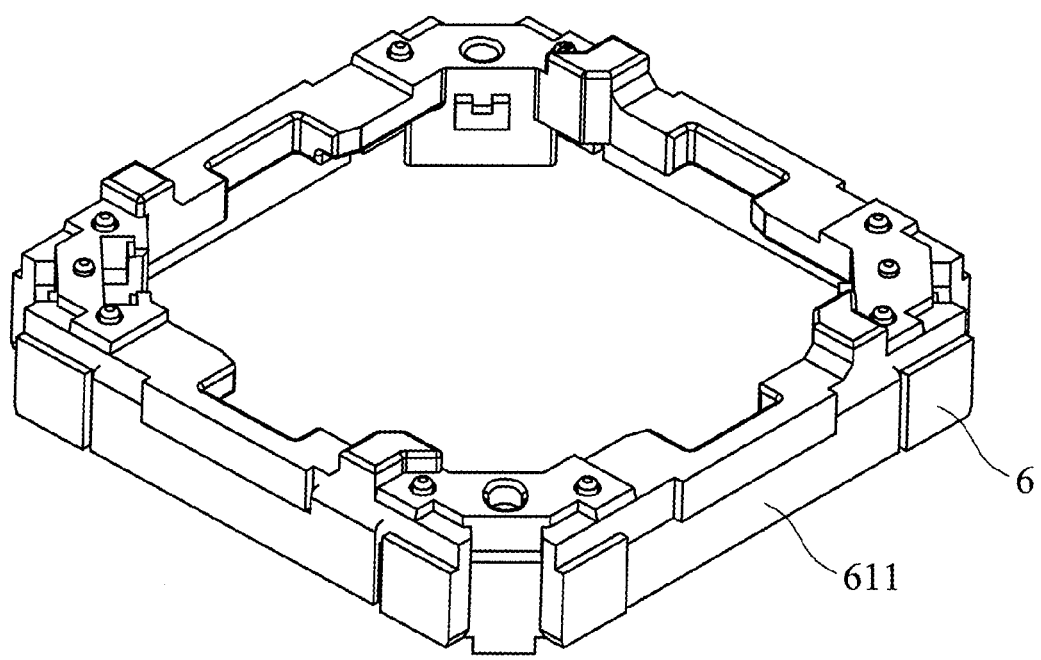
FIG. 10 is a perspective view of a frame in accordance with an embodiment of the invention.

FIG. 10 is a perspective view of the frame 6 in accordance with an embodiment of the invention. Because the four sides of the frame 6 are respectively disposed with the driving magnet 7, a yoke plate 611 can be disposed close to driving magnet 7 at a side away from the optical axis. The yoke plate 611 is made of strong magnetic permeability materials. Leakage of the magnetic field generated by the driving magnet 7 can be restrained by embedding the yoke plate 611 to the frame 6 with the insert molding technique.

A lens driving module of the invention has been completely described. In the aforementioned structure, a z-axis closed loop stabilization structure is added to the xy-axis closed loop stabilization system by the arrangement of the 3-dimensional circuits. Therefore, a 3-axis closed loop stabilization system is realized in a lens driving device.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving device, comprising
a lens portion having at least one lens;
a lens holder holding the lens portion and having a position sensor and a driving coil on an outer surface thereof;
a plurality of 3-dimensional circuits are formed on the outer surface of the lens holder;
a frame accepting the lens holder and holding a plurality of driving magnets facing the driving coil and a sensed object facing the position sensor;
a plurality of springs connected between the lens holder and the frame to allow the lens holder moving in an optical axis direction with respect to the frame;
a base portion having a circuit board; and
a plurality of suspension lines connected between the plurality of springs and the circuit board to allow the frame and the lens holder moving in the direction perpendicular to the optical axis direction with respect to the base portion,
wherein the circuit board is electrically connected to the position sensor and the driving coil through the plurality of suspension lines, the plurality of springs, and the plurality of 3-dimensional circuits.

2. The lens driving device as claimed in claim 1, wherein the lens portion has a quadrilateral structure, and the plurality of suspension lines are disposed at four corners of the quadrilateral structure.

3. The lens driving device as claimed in claim 1, wherein the lens portion has a quadrilateral structure, and the number of the plurality of suspension lines is six.

4. The lens driving device as claimed in claim 1, wherein the plurality of springs comprise:
a B spring disposed at a light exit side of the frame, and
an F spring disposed at a light incident side of the frame,
wherein the F spring is divided into a plurality of pieces which are electrically independent and connected to the plurality of suspension lines respectively.

5. The lens driving device as claimed in claim 4, wherein the B spring is divided into two pieces which are electrically independent,
wherein four of the six pieces of the F spring have a respective arm part extending to the lens holder.

6. The lens driving device as claimed in claim 1, wherein the frame has a plurality of spring connection portions electrically connected to the plurality of springs respectively.

7. The lens driving device as claimed in claim 4, wherein the plurality of spring connection portions are Ruined to the frame by an insert molding technique or a molded interconnect device technique.

8. The lens driving device as claimed in claim 1, wherein the plurality of 3-dimensional circuits are formed to the lens holder by an insert molding technique or a molded interconnect device technique.

9. The lens driving device as claimed in claim 1, wherein when observed from the optical axis direction the sensed object is located between two adjacent ones of the plurality of driving magnets.

10. The lens driving device as claimed in claim 1, wherein when observed from a direction perpendicular to the optical axis direction the sensed object is close to a light incident side and the plurality of driving magnets are close to a light exit side.

11. The lens driving device as claimed in claim 1, wherein a first stop plate protruding in a direction away from the optical axis is formed on the outer surface of the lens holder at a light incident side, and a second stop plate protruding in the direction away from the optical axis is formed on the outer surface of the lens holder at a light exit side,
    wherein the frame is abutted against the first stop plate or the second plate in the optical axis direction to limit a movable range of the lens holder in the optical direction.

12. The lens driving device as claimed in claim 11, wherein when observed from the optical axis direction the first stop plate and the second plate are not overlapped.

13. The lens driving device as claimed in claim 11, wherein a yoke plate with strong magnetic permeability is disposed close to each of the plurality of driving magnets at a side away from the optical axis, and the yoke plate is formed on the outer surface of the frame by an insert molding technique.

* * * * *